US006795280B1

(12) United States Patent
Song et al.

(10) Patent No.: US 6,795,280 B1
(45) Date of Patent: Sep. 21, 2004

(54) TUNNELING MAGNETO-RESISTIVE READ HEAD WITH TWO-PIECE FREE LAYER

(75) Inventors: Dian Song, Eden Prairie, MN (US); Nurul Amin, Burnsville, MN (US); Sining Mao, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/441,901

(22) Filed: Nov. 17, 1999

Related U.S. Application Data
(60) Provisional application No. 60/109,229, filed on Nov. 18, 1998.

(51) Int. Cl.[7] .................................................. G11B 5/39
(52) U.S. Cl. .................................................. 360/324.2
(58) Field of Search ...................................... 360/324.2

(56) References Cited

U.S. PATENT DOCUMENTS

| | | | |
|---|---|---|---|
| 5,390,061 A | 2/1995 | Nakatani et al. | |
| 5,583,725 A | 12/1996 | Coffey et al. | |
| 5,729,410 A | 3/1998 | Fontana, Jr. et al. | |
| 5,898,547 A | 4/1999 | Fontana, Jr. et al. | |
| 5,898,548 A | 4/1999 | Dill et al. | |
| 5,901,018 A | 5/1999 | Fontana, Jr. et al. | |
| 6,023,395 A * | 2/2000 | Dill et al. | 360/324.2 |
| 6,185,079 B1 * | 2/2001 | Gill | 360/324.2 |

OTHER PUBLICATIONS

Moodera, J., Kinder, L., Wong, T., and Meservey, R., "Large Magnetoresistance at Room Temperature in Ferromagnetic Thin Film Tunnel Junctions", *Physical Review Letters*, vol. 74, pp. 3273–3276, Apr. 17, 1995.

Tsuge, H., Mitsuzuka, T., Kamijo, A., and Matsuda, K., "Magnetic Tunnel Junctions with Low Resistance, High Current Density and Good Uniformity", Material Research Society Spring Meeting Proceedings, 1998.

Wong, P., Evetts, J., Blamire, M., "High Conductance Small Area Magnetoresistive Tunnel Junction", *Applied Physics Letters*, vol. 73, pp. 384–386, 1998.

* cited by examiner

*Primary Examiner*—A. J. Heinz

(57) ABSTRACT

A method and apparatus for a recording head using a spin-dependent tunneling (SDT) junction. The SDT junction utilizes an aluminum oxide tunnel barrier. The tunnel barrier can be formed to a thickness comparable with a typical Cu spacer layer on a spin valve. With the SDT junction, current is applied perpendicular to the plane of the film. The SDT junctions can have high magneto-resistance up to 40%. The magnetoresistive qualities of a head design incorporating the SDT junction are not directly related to head resistance, head geometry, bias current and film thickness. The method can include forming a spin tunnel barrier by fashioning a stack into a bottom electrode, defining a junction, depositing a layer of insulator, performing a photoprocess, depositing an upper electrode layer and lifting off the top electrode layer to define the electrode. The stack can include a pinned layer, a barrier layer and a free layer. The pinned layer can include NiFe. The barrier layer can include $AlO_x$. The free layer can include Co. The junction can be defined with an ion mill and the insulator can include $Al_2O_3$. In addition, the top electrode layer can include Cu.

14 Claims, 6 Drawing Sheets

TUNNELING MAGNETO-RESISTIVE READ HEAD WITH TWO-PIECE FREE LAYER

CROSS REFERENCE TO RELATED APPLICATIONS

This application claims the benefit of the provisional application entitled "Design for a Spin Tunnel Junction Recording Head" filed Nov. 18, 1998, bearing the Ser. No. 60/109,229, the contents of which are relied upon and incorporated by reference.

BACKGROUND

The invention relates to magnetic transducers for reading information bits from a magnetic medium. In particular, the invention relates to an improved method of making tunneling magneto-resistive (TMR) read heads and the improved head.

A magneto-resistive (MR) element exhibits a change in electrical resistance as a function of external magnetic field. Such property allows MR elements to be used as magnetic field sensors, read heads in magnetic storage systems, and magnetic random-access-memories. In storage systems, the read head is typically merged with a writer head. The writer writes encoded information to the magnetic storage medium, which is usually a disk coated with hard magnetic films. In a read mode, a magnetic bit on the disk modulates the resistance of the MR element as the bit passes below the read head. The change in resistance can be detected by passing a sense current through the MR element and measuring the voltage across the MR element. The resultant signal can be used to recover data from the magnetic storage medium. Depending on the structure of a device, the MR effect can fall in to different categories, namely, anomalous MR (AMR), giant MR (GMR), tunneling MR (TMR), and colossal MR (CMR).

Most hard disc read heads currently in production utilize an AMR sensor. The essential structure consists of a stripe of soft magnetic material, usually an alloy of Ni, Fe and/or Co. For areal densities beyond about 10 Gbit/inch$^2$, AMR heads give way to GMR heads due to lack of signal.

The GMR device favored by the data storage industry is the spin valve. It consists of a free layer which rotates with the external field, a Cu spacer, and a pinned layer which has a magnetization fixed along one direction. The electrical resistance of a spin valve is a function of the angle between the magnetization in the free layer and the pinned layer. A sensor is the most resistive when the two layers are magnetized in anti-parallel directions, and is the most conductive when they are parallel. Industry has invested heavily in developing a GMR read head, including some mass production. The technology can possibly work for areal densities up to 100 G bit/inch$^2$, beyond which point the sensitivity again becomes an issue.

One possible solution is to use TMR junctions which can give two to three times more signal. In addition, TMR junctions offer more room for engineering design as the TMR effect is less sensitive to the structure of the element than GMR. In particular, the magneto-resistance is usually not related to the junction area, junction resistance, and film thickness.

A TMR junction is very similar to a spin valve in the sense that it also consists of a free layer, a spacer, and a pinned layer. The magneto-resistance rises from the angular difference between the magnetization in the two magnetic layers in a way entirely analogous to a spin valve. A major difference between TMR junction and spin valve is that the spacer in a TMR junction is made of an insulator, typically aluminum oxide. Moreover, the electrical current is flown perpendicular to the plane of the films as oppose to in the plane for GMR sensors. Consequently, one must attach a top and a bottom electrode to the junction stack in order to measure the electrical property.

CMR effect has so far been limited to cryogenic temperature and/or in extremely high magnetic field up to 10,000 Oe. Industrial applications have therefore been limited.

Regardless of the different types of MR elements, such structure is further shielded by high permeability films, like NiFe, in a read head. In some cases, the active sensor and leads are isolated from the shields by insulator material like metal oxide or nitride. The function of the shields is to protect sensor from the stray magnetic field originating from all magnetic bits on the medium, except the one just underneath the sensor.

Fabrication of a sensor involves several deposition, etching, and photo processes. Typically, an insulator layer is deposited on a ceramic substrate and then polished. A first magnetic shield is deposited and shaped, followed with deposition of a thin insulator layer called first half gap. Then, a series of depositions, etching, milling and lift-off processes are performed to fabricate the active sensor. The sensor structure is then covered with an insulator layer called a second half gap after which follows the deposition of a second shield, also referred to as the shared pole. The writer structure can be built over the second shield. A thick insulator can be deposited to encapsulate the whole structure, sensor and writer, after which the structure can be polished again. Pads are applied to the electrical leads for later wire bonding to an external circuitry. Finally, the wafer can be sliced into bars each carrying an array of sensors. Bars can be lapped to obtain sensor of a desired dimension. During machining process several photo and ion-mill operations are conducted to grove a proper air bearing design used later for slider to fly at a desired altitude on a magnetic medium. Each bar is then diced into individual sliders.

A TMR read head was first disclosed in U.S. Pat. No. 5,390,061 by Hitachi, Ltd.; however, this did not include horizontal bias. An improved design with horizontal bias was disclose by IBM in U.S. Pat. No. 5,729,410. IBM has subsequently improved their design in U.S. Pat. Nos. 5,898,547, 5,898,548, and 5,901,018. Specifically, the IBM patents showed a flux guide design, which is suited for a TMR reader. The design allows the usage of a large area junction. This helps to reduce the junction resistance, which remains the leading obstacle for high density reader. The problem with the IBM design is that the tunnel barrier was made in an ex-situ fashion, i.e. the barrier was exposed to air before the deposition of the top electrode. In practice, such method yields junctions with unacceptably poor quality. What is needed is a TMR head with a quality tunnel barrier.

SUMMARY OF THE INVENTION

Accordingly, the present invention provides a method for forming a flux-guide type TMR head with an in-situ tunnel barrier and the resultant structure. The TMR head includes a spin-dependent tunneling (SDT) junction utilizing an aluminum oxide tunnel barrier. The tunnel barrier can be formed to a thickness comparable with a typical Cu spacer layer on a spin valve. With the SDT junction, current is applied perpendicular to the plane of the film. The SDT junctions can have high magneto-resistance up to 40%. The magnetoresistive qualities of a head design incorporating the SDT junction are not directly related to head resistance, head geometry, bias current and film thickness.

According to one aspect of the invention a method for forming a spin tunnel barrier is disclosed wherein the stack is fashioned into a bottom electrode. A junction is defined from a tri-layer portion of the stack. A layer of insulator is deposited over the junction and the photoresist layer used to form the junction and insulator layer is lifted off. An upper electrode can also be deposited, including a flux guide.

The stack fashioned into the bottom electrode can include a pinned layer, a barrier layer and a free layer. The pinned layer can include Ni, Fe, Co, or any alloy of these elements, such as NiFe. The barrier layer is typically formed from an oxide or nitride of Al, Ta or Si, such as, $AlO_x$. The free layer, like the pinned layer can include Ni, Fe, Co, or any alloy of these elements, such as NiFe.

Typically, the junction will be defined with an ion mill or sputter etch. Similar to the barrier layer, the insulator can include an oxide or nitride of Al, Ta or Si, such as, $Al_2O_3$. The top electrode layer will typically be formed from Cu.

According to another aspect, the invention discloses a method of creating a spin-tunnel junction head on a sheet film. The method includes depositing a pinned layer and a tunnel barrier. A first free layer can then be deposited onto the tunnel barrier, and a subsequent capping layer formed above the first free layer. A junction can be cut into the structure with an ion mill or sputter etch process. An insulation layer can also be deposited, after which the capping layer and a portion of the first free layer can be removed. The capping layer can be removed with a sputter etch or ion mill process. Finally, a second free layer can be deposited.

In another embodiment, the invention additionally includes depositing a conduction layer and etching the second free layer. In addition, a permanent magnet can be deposited as well as an exchange tab.

In another aspect of the invention a recessed shield can be used to cause media flux to penetrate to a depth approximately equal to the junction height. The recessed shield can allow for a junction that is wider than the width of a reader portion of the head.

In still another embodiment, a spin tunnel junction magnetoresistive head including a pinned layer, a tunnel barrier, a first free layer, a capping layer, a junction, an insulation layer and a second free layer is disclosed. A conduction layer, a permanent magnet portion and an exchange tab can also be included The details of one or more embodiments of the invention are set forth in the accompanying drawings and the description below. Implementations may provide advantages such as facilitating access to support documentation and device drivers. Other features, objects and advantages of the invention will be apparent from the description and drawings, and from the claims.

DETAILED DESCRIPTION OF THE INVENTION

Figure 1:
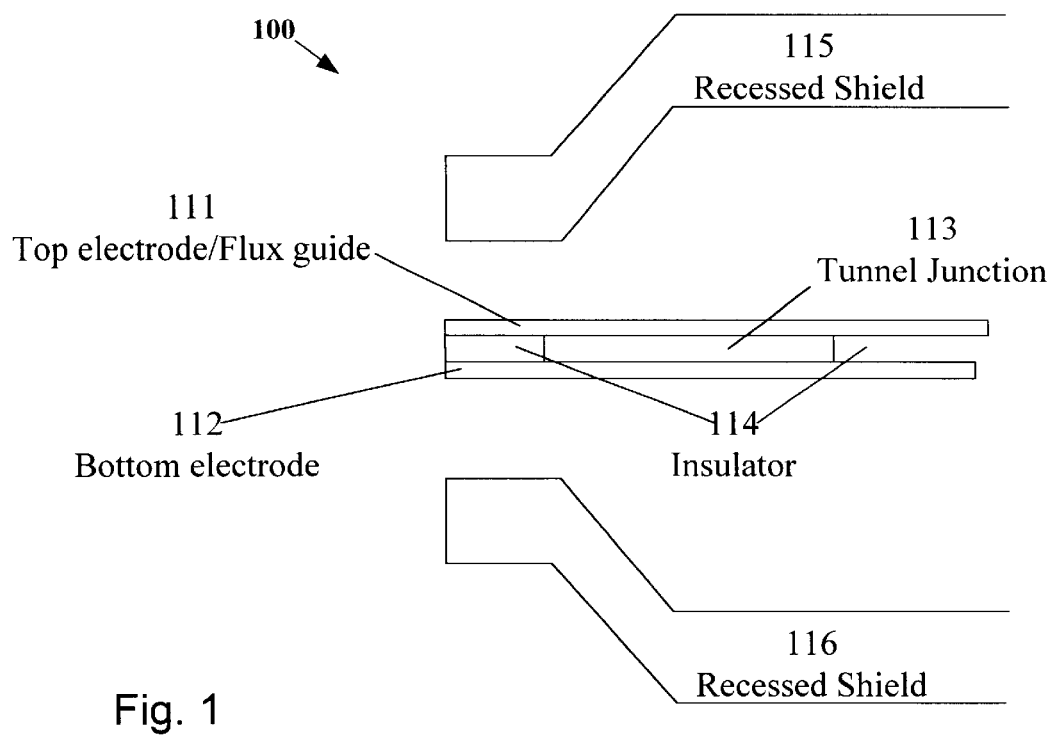
FIG. 1 illustrates a tunnel junction head.

Referring to FIG. 1 a basic design of a two piece free layer magnetoresistive head 100, formed by an insitu or tri-layer process, can include a top electrode flux guide 111 and a bottom electrode 112. A tunnel junction 113 is situated between the top electrode 111 and the bottom electrode 112. An insulator 114 can be placed adjacent either side of the tunnel junction 113 and also between the top electrode 111 and bottom electrode 112. An upper metal recessed shield 115 and a bottom recessed shield 116 can surround the electrodes 111 & 112 and tunnel junction 113.

Figure 2:
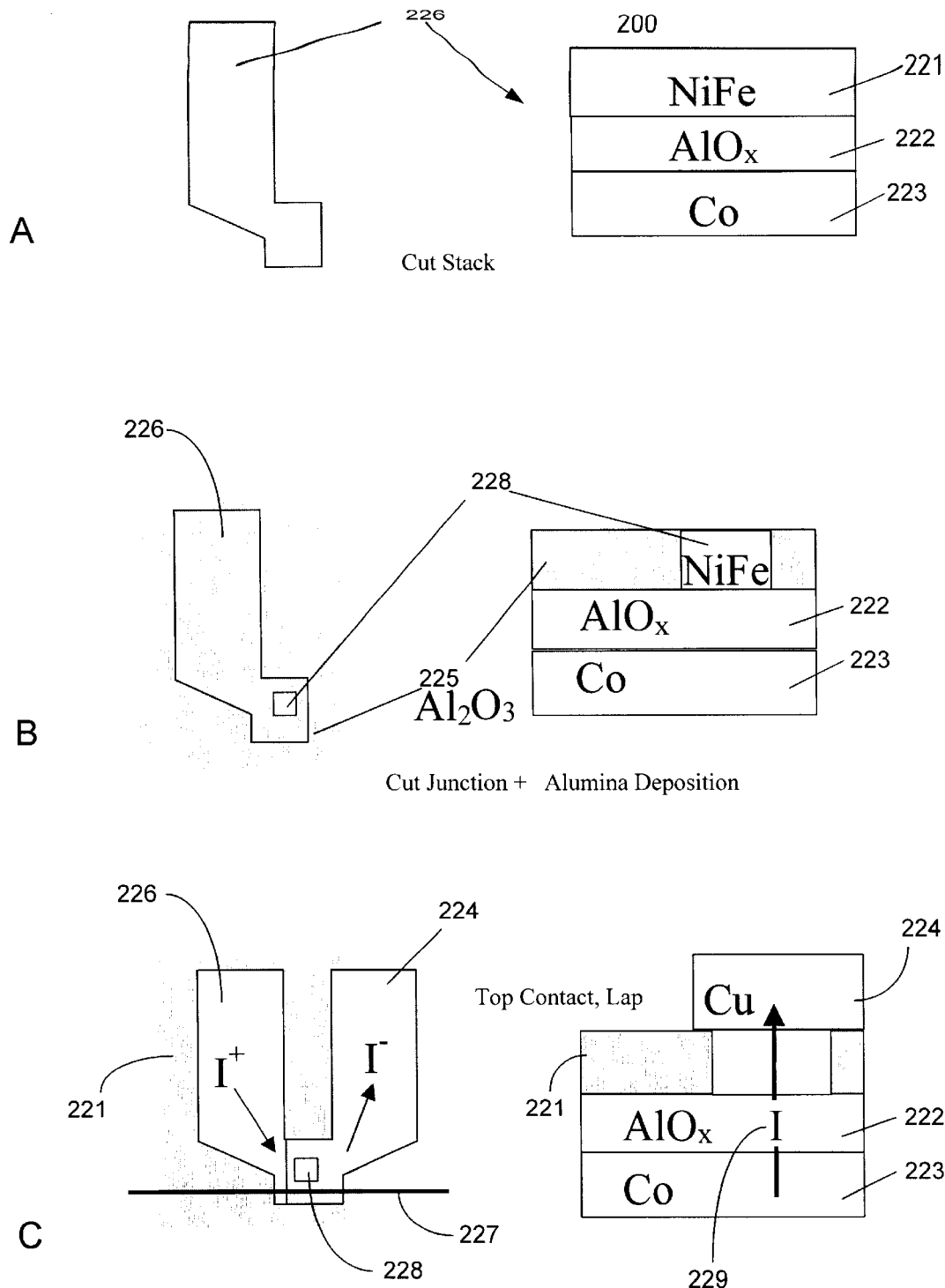
FIG. 2 illustrates a block diagram of a tunnel junction formation.

Referring now to FIG. 2, a typical fabrication process of a spin tunnel barrier used in the formation of a magnetoresistive head can be based on a spin tunnel junction tri-layer stack 200. The tri-layer stack 200 can include a pinned layer 221 (also known as a fixed layer), a barrier 222 and a free layer 223, formed on a substrate. An example of the tri-layer can include a sheet film deposition of NiFe 221, $AlO_x$ 222 and Co 223. In step A, the tri-layer stack 220 is cut, or patterned, by ion mill to form a bottom electrode 226.

In step B, a junction 228 can be defined by timed ion mill stopping in the middle of the pinned layer. In the example illustrated, milling is used to remove NiFe from the surface of the electrode except in the junction area 228. The milling should stop within the $AlO_x$ 222. Following milling, a layer of insulator is formed. In one embodiment, a self-aligning process can be used to lift off the insulating layer, such as $Al_2O_3$ 225, to insure the current goes through the junction. In step C, a top contact is deposited to define a top electrode 224. The top electrode can, for example be Cu or Fe.

A transverse line 227 illustrates the position to which the finished sensor is lapped. Since the barrier is typically only about 20Å of $AlO_x$, lapping will most likely cause shorting in the junction. This is in contrast to a typical spin valve, which is usually an all-metal structure and thus much less vulnerable to shunting from embedded metal particles.

Figure 3:
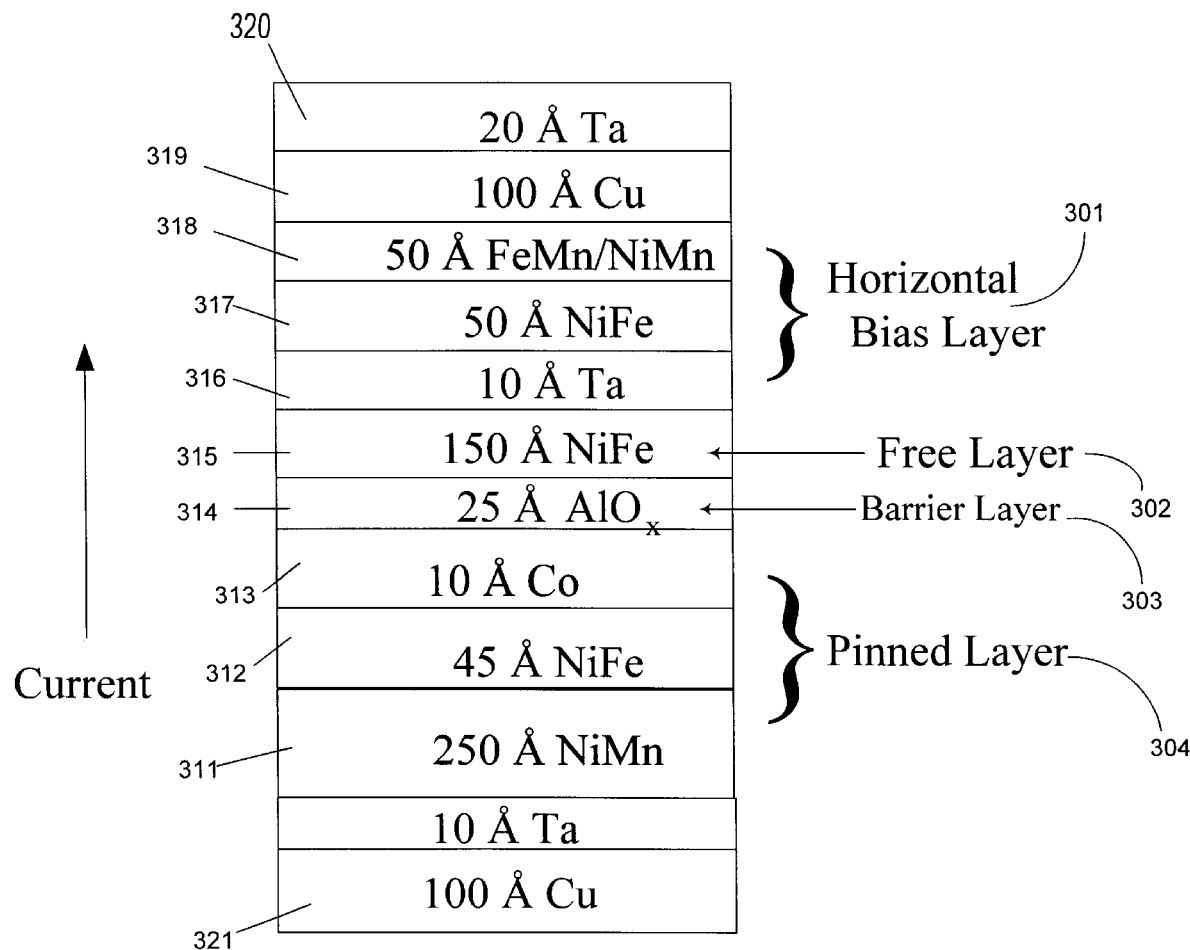
FIG. 3 illustrates the various layers included in one embodiment of the invention.

Referring now to FIG. 3, a block diagram cross section of one embodiment of the invention represents a bottom spin tunnel junction with sheet film orange-peel horizontal bias. The cross section illustrates an example of various layers present in the spin tunnel junction. The layers include a horizontal bias layer 301, a free layer 302, a Barrier layer 303, and a pinned layer 304.

The NiMn 311 included in the pinned layer is at the bottom, followed by NiFe 312. To minimize the demagnetizing field from the pinned layer, a Co/Ru/Co composite pinned layer 313 can be used. Alternatively, one can use the demagnitizing field to cancel the orange peel/exchange coupling through the tunnel barrier. This can be achieved by adjusting the thickness of the free layer and the pinned layer. In contrast to a spin valve head, field induced by current is minimal in tunnel junction. If the demagnetizing field can be canceled by the coupling field, the undesirable stray fields can be minimized.

The barrier layer 303 including $AlO_x$ 314 can follow the Co composite layer 313. The freelayer 302 including NiFe is on top of the barrier layer 303.

Above the free layer, there can be another pinning structure with a thin Ta spacer 316. The spacer provides a weak (~20 Oe) horizontal bias on the free layer via orange-peel coupling. At the same time, it also serves as a seed layer to promote texture in NiFe 317 and FeMn 318 (or NiMn 318). In one embodiment, the texture established in the first Ta seed layer 316 is terminated by the $AlO_x$ barrier. A top pinning layer can cover the entire sensor.

A Cu conduction layer 319 at the top of the stack and a Cu conduction layer 321 at the bottom of the stack can be used to promote uniform current distribution within the junction. Given a typical junction resistance of ~30 Ωm², and the sheet film resistance of the stack (about 30 Ω/square without Cu), the distribution of current will not be uniform if conduction layers are not used. Although the non-uniform distribution may actually increase GMR, it can be hard to control.

The position of the insulating layer can also be important for obtaining a stable device. The top of the insulating layer should be aligned with the free layer. Then part of the free layer can be removed and additional NiFe deposited with the horizontal bias layer. In this manner, the free layer thickness variation and slope near the junction edge can be minimized.

Figure 4A:
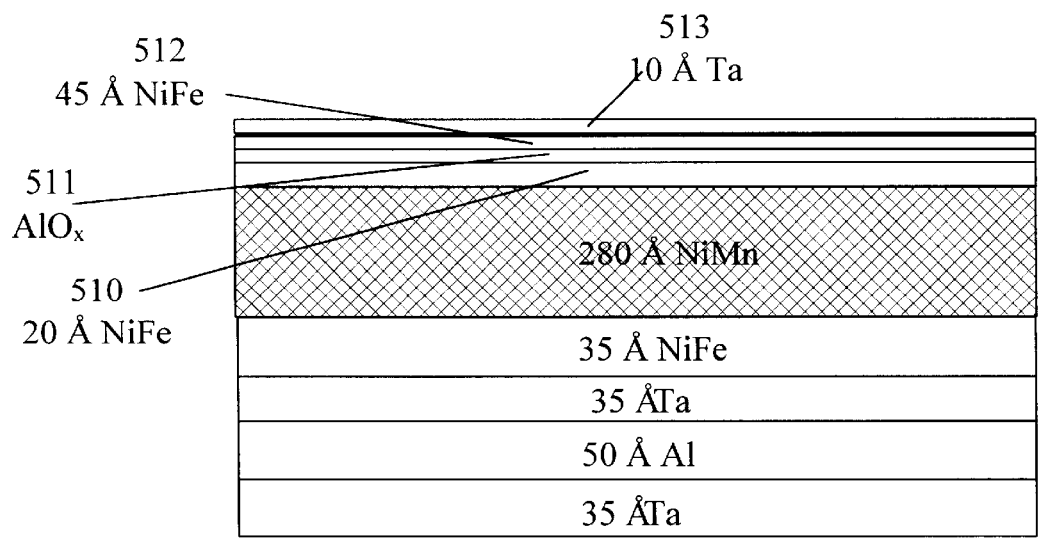
FIG. 4 illustrates the formation steps of a tunnel junction head.
Figure 4B:
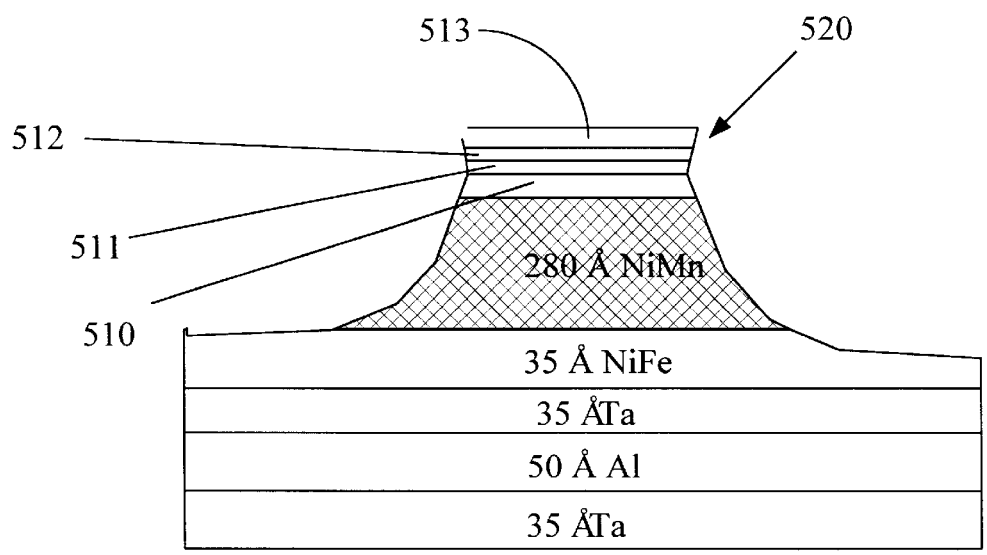

Referring now to FIGS. 4A through 4D, various steps in a fabrication process of one embodiment of the invention are illustrated. FIG. 4A illustrates a sheet film deposition of a complete junction structure including a pinned (fixed layer) 510, a tunnel barrier 511, and a first free layer 512. FIG. 4B illustrates the cutting of a junction 520 by ion mill.

Figure 4C:
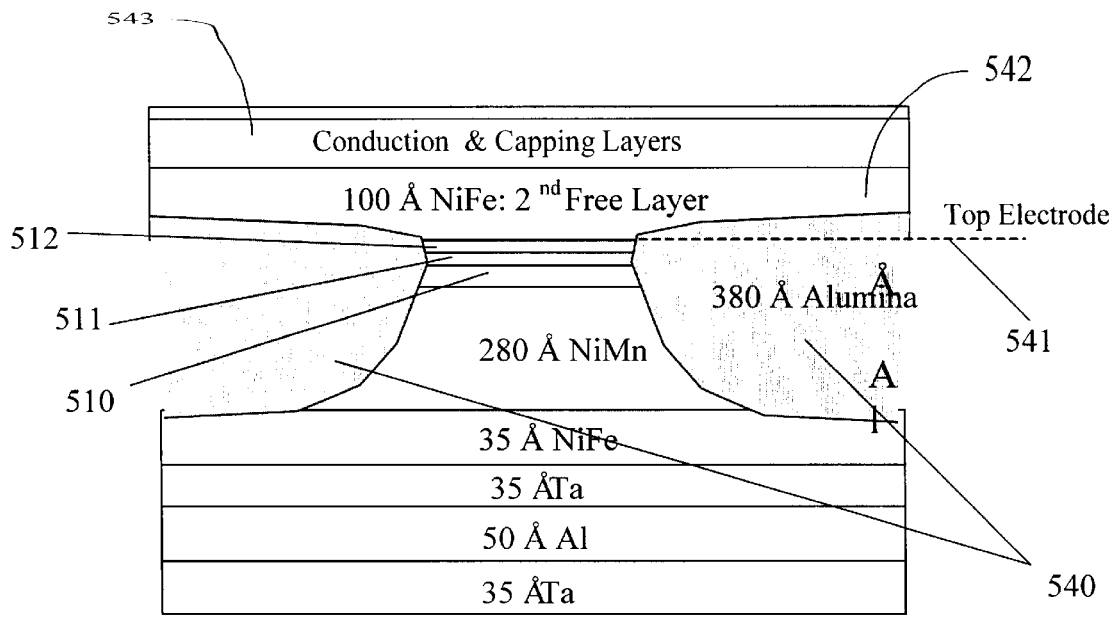

Referring now to FIG. 4C an insulation layer 540 is deposited after the junction is cut. The insulation layer can be, for example, alumina. The capping layer 513 and part of the first free layer 512 can then be sputter etched and a second free layer (sensing layer) 542 can be deposited. The second free layer 542 can, for example, be NiFe. A conduction and capping layer 543 can also be applied. The insitu process for junction fabrication facilitates a two piece free layer structure for a flux guide type magnetoresistive head.

Figure 4D:
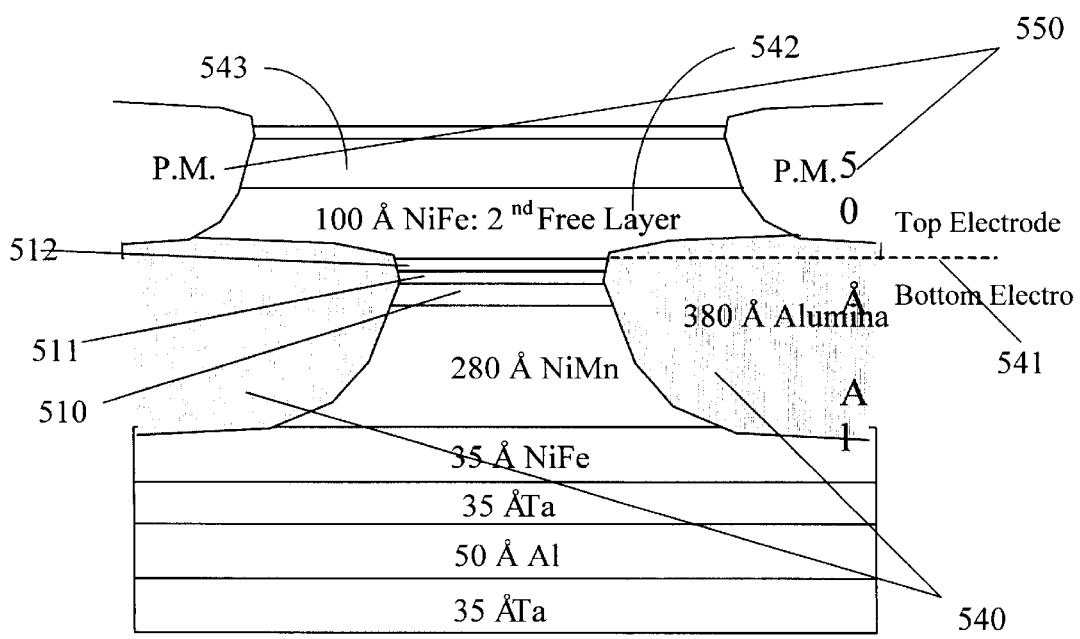

Referring now to FIG. 4D, the second free layer can be etched and a permanent magnet 550 can be deposited. The permanent magnet 550 can be used for horizontal bias. Exchange tabs or other means can also be used for horizontal biasing.

Figure 5:
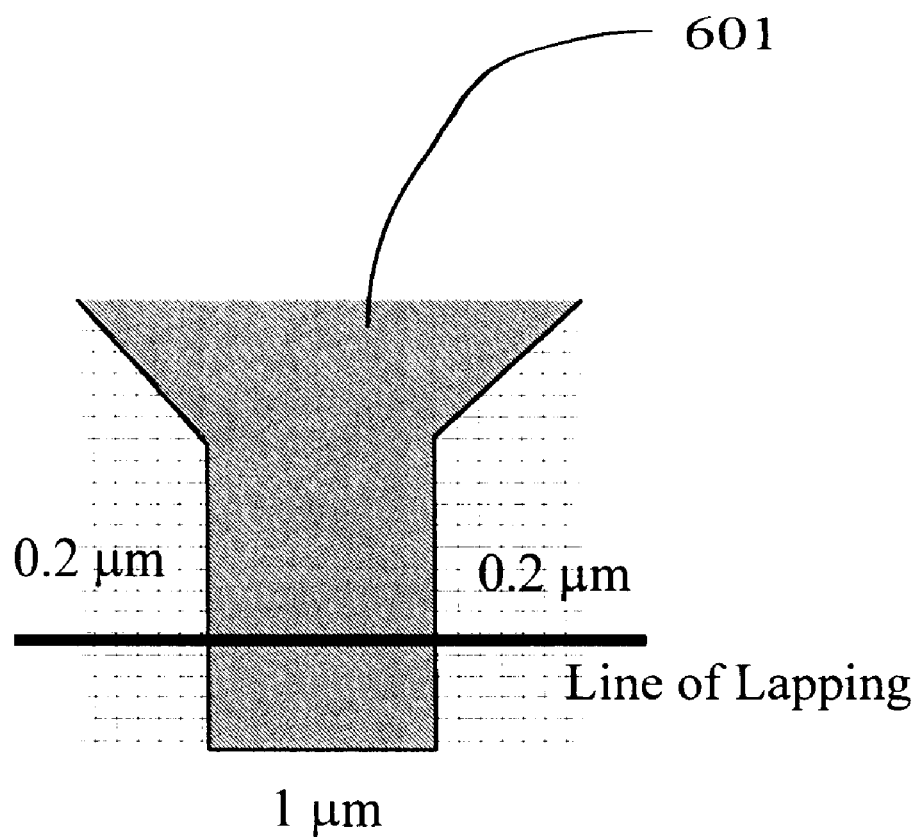
FIG. 5 illustrates the relative reader width of a top electrode and a junction.

Referring now to FIG. 5, the reader width of the top electrode 601 can be approximately 1.4 μm. The size at the junction can be typically 1 μm. The NiFe layer deposited as part of the top electrode serves has a flux guide. Assuming a gap of g=50 nm, NiFe thickness of T=10 nm, and NiFe $M_s$ of about 800 emu/cm³, an estimation of the flux from the media would penetrate into the sensor to a depth of about $$\sqrt{\frac{\mu g T}{2}} = 0.45 \text{ μm}.$$

Thus for a junction which is 1 μm high, only part of the free layer will respond to the media field.

For low resistivity junctions, JMR (Junction Magneto Resistance) can drop rapidly. For instance, a NiFe junction can have only 2% of JMR at 30Ωμm² compared with its full JMR of about 14% at R>200 kΩμm². By making larger size junctions, one can go to higher areal resistance and thus have a higher GMR (Giant Magneto Resistance). However, with a larger junction only part of the junction generally responds to an external field. Therefore a desired junction size should balance the two aspects.

One way to fully utilize the potential of a large junction is to have media flux penetration to a depth approximately equal to the junction height. To achieve this goal, a recessed shield can be used. In one embodiment, the gap can be made about 0.2 μm away from the ABS. This gap helps to keep the magnetic flux within the free layer. For example, if the gap is made 200 nm thick away from the ABS, the flux penetration depth will double. A recessed shield also allows variance of junction shape, wherein the junction is not limited a square shape. For example, the junction may be wider than the reader width without increasing the effective reader width.

A number of embodiments of the present invention have been described. Nevertheless, it will be understood that various modifications may be made without departing from the spirit and scope of the invention. Therefore, other implementations are within the scope of the following claims.

What is claimed is:

1. A spin tunnel junction magnetoresistive head comprising:
   a junction having at least two sides, the junction further comprising:
      a pinned layer;
      a tunnel barrier;
      a first free layer;
   an insulation layer positioned on the at least two sides; and
   a second free layer positioned on the insulation layer and the junction.

2. The spin tunnel junction magnetoresistive head of claim 1 additionally comprising:
   a conduction layer; and
   a permanent magnet portion.

3. The spin tunnel junction magnetoresistive head of claim 2 further comprising a first and second recessed shield.

4. The spin tunnel junction magnetoresistive head of claim 2 additionally comprising a recessed shield.

5. The spin tunnel junction magnetoresistive head of claim 1 wherein the pinned layer comprises Ni, Fe, Co or an alloy thereof.

6. The spin tunnel junction magnetoresistive head of claim 1 wherein the barrier layer comprises an oxide or nitride selected from a group consisting of Al, Ti, or Si.

7. The spin tunnel junction magnetoresistive head of claim 1 wherein the first and second free layer comprises Ni, Fe, Co or an alloy thereof.

8. The spin tunnel junction magnetoresistive head of claim 1 wherein the insulator comprises an oxide or nitride selected from the group consisting of Al, Ta, or Si.

9. A sensor comprising:
   a junction having a top, a bottom, a first and second side, the junction further comprising:
      an active region and a passive region, wherein the active region includes a pinned layer, tunnel barrier, and a first free layer;
      a passive region positioned directly adjacent the first and second side of the active region, the passive region including an insulating material; and
   a second free layer positioned on the junction, wherein the second free layer is positioned on the top of the junction and is in contact with the both the passive and active region of the junction.

10. The sensor of claim 9, wherein the free layer further comprises at least two sides, further wherein a first and second permanent magnet is positioned on the at least two sides.

11. The sensor of claim 9, wherein the pinned layer comprises of a Co/Ru/Co composite layer.

12. The sensor of claim 9, wherein the insulator material comprises an oxide or nitride selected from the group, consisting of Al, Ta, or Si.

13. The sensor of claim 9, wherein the first and second free layer comprises Ni, Fe, Co or an alloy thereof.

14. The sensor of claim 9 further comprising a first and second recessed shield.

* * * * *